(12) United States Patent
Park et al.

(10) Patent No.: US 10,964,965 B2
(45) Date of Patent: Mar. 30, 2021

(54) COD CONTROL METHOD AND SYSTEM FOR FUEL CELL

(71) Applicants: Hyundai Motor Company, Seoul (KR); Kia Motors Corporation, Seoul (KR)

(72) Inventors: Jeong Kyu Park, Gyeonggi-do (KR); Chang Hwan Ye, Gyeonggi-do (KR); Gun Hyung Park, Gyeonggi-do (KR); Sae Byeok Seung, Chungcheongnam-do (KR); Sang Chul Yeom, Gyeonggi-do (KR); Seung Yoon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 15/985,163

(22) Filed: May 21, 2018

(65) Prior Publication Data

US 2019/0165398 A1 May 30, 2019

(30) Foreign Application Priority Data

Nov. 24, 2017 (KR) .................. 10-2017-0158940

(51) Int. Cl.
| | |
|---|---|
| *H01M 8/04537* | (2016.01) |
| *B60L 7/10* | (2006.01) |
| *H02J 7/14* | (2006.01) |
| *H01M 8/04828* | (2016.01) |
| *H02J 7/00* | (2006.01) |

(Continued)

(52) U.S. Cl.
CPC ......... *H01M 8/04947* (2013.01); *B60K 11/02* (2013.01); *B60L 7/10* (2013.01); *B60L 58/34* (2019.02); *H01M 8/04037* (2013.01); *H01M 8/04619* (2013.01); *H01M 8/04626* (2013.01); *H01M 10/46* (2013.01); *H02J 7/0068* (2013.01); *H02J 7/14* (2013.01); *H02J 7/34* (2013.01); *B60L 2240/54* (2013.01); *H01M 2250/20* (2013.01)

(58) Field of Classification Search
CPC ......... H01M 8/04947; H01M 8/04037; H01M 8/04619; H01M 8/04626; H01M 10/46; H01M 2250/20; H01M 8/046; B60L 58/34; B60L 7/10; B60L 2240/54; B60K 11/02; H02J 7/0068; H02J 7/14; H02J 7/34

See application file for complete search history.

(56) References Cited

FOREIGN PATENT DOCUMENTS

| | | | |
|---|---|---|---|
| JP | 2013099081 A | * | 5/2013 |
| KR | 2009 0039892 A | | 4/2009 |

(Continued)

OTHER PUBLICATIONS

English translation of KR-20090039892-A (Year: 2009).*

(Continued)

*Primary Examiner* — Christopher P Domone
*Assistant Examiner* — Kimberly Wyluda
(74) *Attorney, Agent, or Firm* — Mintz Levin Cohn Ferris Glovsky and Popeo, P.C.; Peter F. Corless

(57) ABSTRACT

A cathode oxygen depletion (COD) control method is provided. The method includes determining whether a COD heater operates and calculating power generation and power consumption when the COD heater operates. Additionally, the power consumption is adjusted by comparing the calculated power generation and power consumption.

7 Claims, 5 Drawing Sheets

(51) Int. Cl.
*H01M 8/04007* (2016.01)
*H01M 10/46* (2006.01)
*B60K 11/02* (2006.01)
*B60L 58/34* (2019.01)
*H02J 7/34* (2006.01)

(56) References Cited

FOREIGN PATENT DOCUMENTS

| KR | 20090039892 A | * | 4/2009 |
| KR | 20090062867 A | * | 6/2009 |
| KR | 10 1417115 B1 | | 7/2014 |

OTHER PUBLICATIONS

English translation of KR-20090062867-A (Year: 2009).*
Florida Solar Energy Center (Hydrogen Basics—Fuel Cells) (Year: 2010).*
EPO machine generated English translation of JP-2013099081-A (Year: 2013).*

* cited by examiner

G = power generation
C = power consumption

COD CONTROL METHOD AND SYSTEM FOR FUEL CELL

CROSS REFERENCE TO RELATED APPLICATION

The present application claims priority to Korean Patent Application No. 10-2017-0158940, filed Nov. 24, 2017, the entire contents of which is incorporated herein for all purposes by this reference.

BACKGROUND

Field of the Invention

The present invention generally relates to a cathode oxygen depletion (COD) control method and system for a fuel cell, and more particularly, to a technique that prevents energy consumption of a high voltage battery when a COD operates during regenerative braking.

Description of the Related Art

Generally, a fuel cell system refers to a system, which directly converts fuel energy into electrical energy. In the fuel cell system, an anode and a cathode are disposed to have an electrolyte interposed therebetween, and electricity and heat are obtained together through an electrochemical reaction of ionized fuel gases.

A fuel cell system applied to a current fuel cell vehicle includes a fuel cell stack configured to generate electric energy from an electrochemical reaction of reaction gases, a hydrogen supply device configured to supply hydrogen as a fuel to the fuel cell stack, an air supply device configured to supply air containing oxygen which is an oxidant required for the electrochemical reaction, and a thermal management system configured to optimally adjust an operation temperature of the fuel cell stack by discharging heat, which is a byproduct of the electrochemical reaction of the fuel cell stack, to the outside.

To maintain expected lifespan and operational performance of the fuel cell and obtain the most stable output condition, for polymer electrolyte fuel cells, the temperature of the fuel cell should be maintained within a temperature range of approximately 25° C. (room temperature) to 80° C. Therefore, a process, such as cooling of the stack, by a thermal management system is necessary to prevent the temperature increase of the stack in a fuel cell system. Generally, a thermal management system is mainly used in which water is circulated through a coolant channel in the stack to maintain the fuel cell stack at an optimum temperature.

Such a thermal management system (TMS) includes a coolant line that is connected between a fuel cell stack and a radiator for circulation of a coolant, a bypass line and a 3-way valve for bypassing the coolant without passing through the radiator, a pump that pumps the coolant through the coolant line, a heater that heats the coolant, and the like. Further, it may be possible to obtain effects of preventing deterioration of the stack, improving durability, improving cold startability, expanding regenerative braking, and the like by using the heater for coolant.

A cathode oxygen depletion (COD) is connected to both terminals of the stack to prevent degradation of the durability of the stack when the fuel cell vehicle is started up or shut down, and thus, power generation by reaction of hydrogen and oxygen is consumed as thermal energy. Therefore, a heater, which is capable of rapidly heating the coolant to help the stack generate power at a temperature below the freezing point smoothly after the start of the vehicle, is required, in addition to the COD. When the heater for the coolant is separately constructed from the COD, cost for components increases and a layout space is unable to be ensured. A combined COD/heater unit for a fuel cell vehicle, which combines a heater function for ensuring the cold startability of the fuel cell vehicle and a COD function for ensuring the durability of the existing stack, is used.

The fuel cell vehicle has a regenerative braking function that charges the high voltage battery with the energy regenerated during braking. Therefore, power is recovered from the motor by regenerative braking when the fuel cell vehicle is driven downhill, and the corresponding energy is used for charging the high voltage battery. However, when a state of charge (SOC) of the high voltage battery exceeds a limit value while the vehicle is continuously driven on the downhill road, the regenerative braking becomes impossible since the battery is no longer capable of being charged.

In such situation, the regenerative braking is capable of being maintained as much as possible by operating the COD heater and consuming excess power including energy recovered by regenerative braking. In addition, the dump power is maximally consumed by operating the auxiliary machinery including the coolant pump, a heat dissipation fan of a radiator, and the like to consume a maximum amount of power. However, when the COD heater is operated, the power consumption is maintained constant and the power consumption of the auxiliary machinery is maintained at a maximum. Therefore, when the COD consumption output is greater than the dump power, the high voltage battery discharges and thus, charge amount decreases.

FIG. 1 shows charged amount and output of a battery when a COD heater is operated during regenerative braking according to a related art. Referring to FIG. 1, the SOC of the high voltage battery is gradually decreased as the COD heater is continuously operated when changed from the third stage of regenerative braking mode (CstRgn LV3) to the first stage of regenerative braking mode (CstRgn LV1), and the battery is discharged and generates power by discharging charged energy.

FIG. 2 shows regenerative braking energy as a function of a vehicle speed and regenerative braking mode according to the related art. Referring to FIG. 2, the COD heater constantly consumes power. Therefore, when the COD heater is operated in the regenerative braking mode, the COD heater constantly consumes power.

Accordingly, the high voltage battery is charged when the vehicle speed is equal to or greater than 37 kph in the third stage of regenerative braking mode (CstRgn LV3). However, the vehicle consumes the charged amount of the high voltage battery when the vehicle speed is less than 37 kph. In the second stage of regenerative braking mode (CstRgn LV2), the high voltage battery is charged when the vehicle speed is 68 kph or greater. However, the vehicle consumes the charged amount of the high voltage battery when the vehicle speed is less than 68 kph and the vehicle consumes the charged amount of the high voltage battery (CstRgn LV1) in the entire vehicle speed range.

When the charge amount of the battery is below a predetermined level, the COD heater is stopped and the high voltage battery is charged by regenerative braking. However, when the driving of the vehicle on the downhill road is completed before the regenerative braking energy is recovered, only the charged amount of the battery is wasted. In other words, as the COD heater is operated while driving in the regenerative braking mode, the high voltage battery is discharged by consuming the charged amount, resulting in waste of electric power and a decrease of driving efficiency.

The foregoing is intended merely to aid in the understanding of the background of the present invention, and is not intended to mean that the present invention falls within the purview of the related art that is already known to those skilled in the art.

SUMMARY

Accordingly, the present invention provides a COD control method and system for a fuel cell, in which the system compares power generation and power consumption to maintain a charged amount of a high voltage battery when a COD heater is operated.

According to one aspect of the present invention, a COD control method for a fuel cell may include: determining whether a cathode oxygen depletion (COD) heater operates; calculating power generation and power consumption when the COD heater operates; and adjusting the power consumption by comparing the calculated power generation and power consumption.

In particular, before determining whether the COD heater operates, the method may further include checking a charge amount of a high voltage battery. The COD heater is operated when the charge amount of the high voltage battery is equal to or greater than a predetermined charge amount. Before determining whether the COD heater operates, the method may further include determining whether a vehicle having the COD heater is in a regenerative braking state, wherein the COD heater is when the vehicle is in the regenerative braking state and a charge amount of a high voltage battery is equal to or greater than a predetermined charge amount.

When calculating the power generation and the power consumption, the power generation may be calculated by including power recovered by regenerative braking. Additionally, the power consumption may be calculated by including power consumed by the COD heater, a coolant pump, and a heat dissipation fan cooling a radiator. A rotation speed of a coolant pump or a heat dissipation fan cooling a radiator may be adjusted to be variable based on a difference between the calculated power consumption and power generation. In particular, the rotation speed of the coolant pump or the heat dissipation fan may be variably adjusted by a prestored map.

Further, the rotation speed of the coolant pump or the heat dissipation fan may be increased when the power consumption is equal to or less than the power generation, and the rotation speed of the coolant pump or the heat dissipation fan may be decreased when the power consumption exceeds the power generation. A voltage applied to the COD heater may be variably adjusted when the rotation speed of the coolant pump or the heat dissipation fan becomes a predetermined maximum value or minimum value. In particular, the voltage applied to the COD heater may be variably adjusted by a prestored map based on the difference between the calculated power consumption and power generation.

Further, the voltage applied to the COD heater may be increased when the rotation speed of the coolant pump or the heat dissipation fan becomes the predetermined maximum value, and the voltage applied to the COD heater may be decreased when the rotation speed of the coolant pump or the heat dissipation fan becomes the predetermined minimum value. A bidirectional direct current-direct current (DC-DC) converter of a main bus terminal connected to a fuel cell stack may be operated to change the voltage applied to the COD heater.

According to another aspect of the present invention, a COD control system for a fuel cell may include: a COD heater consuming power of a main bus terminal connected to a fuel cell stack; and a controller configured to determine whether the COD heater operates, calculate power generation and power consumption when the COD heater operates, and adjust the power consumption by comparing the calculated power generation and power consumption.

The system may further include: a regenerative braking determining unit configured to determine whether a vehicle having the COD heater is in a regenerative braking state; and a high voltage battery connected to the main bus terminal and configured to store power through charging or supplying power through discharging. The controller may be configured to operate the COD heater when the regenerative braking determining unit determines that the vehicle is in the regenerative braking state and a charge amount of the high voltage battery is equal to or greater than a predetermined charge amount.

The controller may further be configured to adjust the power consumption by variably adjusting a rotation speed of a coolant pump or a heat dissipation fan cooling a radiator. The controller may be configured to variably adjust a voltage applied to the COD heater when the rotation speed of the coolant pump or the heat dissipation fan becomes a predetermined maximum or minimum value. Additionally, the controller may be configured to adjust the power consumption by operating a bidirectional DC-DC converter of the main bus terminal connected to the fuel cell stack and variably adjusting a voltage applied to the COD heater.

According to the COD control method and system for the fuel cell, the control method and system prevent power charged to the high voltage battery from being wasted unnecessarily, thereby improving driving efficiency. In addition, the control method and system decrease occurrence of noise by reducing the driving revolutions per minute (RPM) of the heat dissipation fan and the pump. The control method and system also reduce the times of driving of the heat dissipation fan and the pump, and minimize the times of charging and discharging of the high voltage battery, thereby increasing durability.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
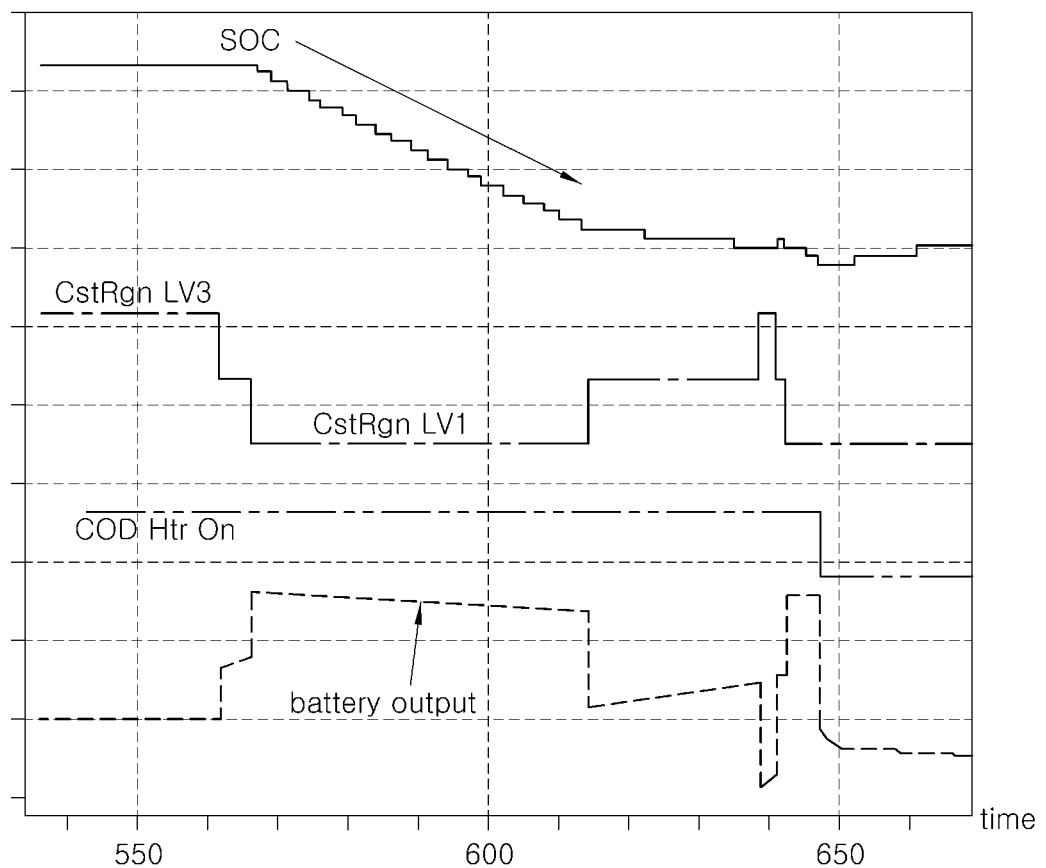
FIG. 1 shows a charge amount and output of a battery when a COD heater is operated during regenerative braking according to a related art.
Figure 2:
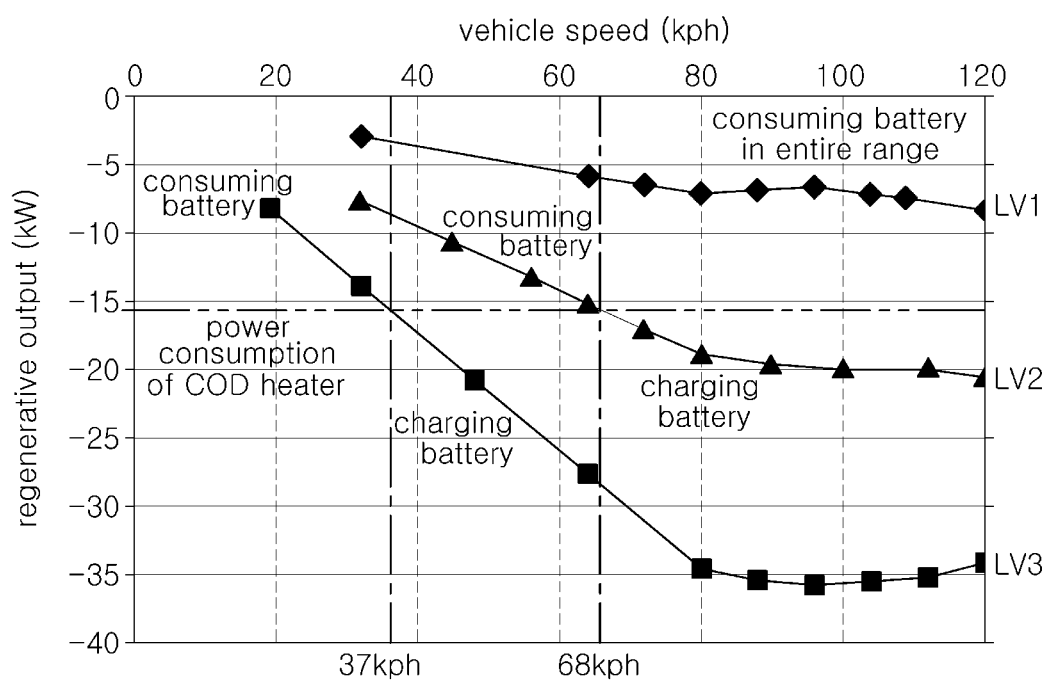
FIG. 2 shows regenerative braking energy as a function of a vehicle speed and regenerative braking mode according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of exemplary embodiments of the present invention disclosed herein are only for illustrative purposes of the embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the exemplary embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referral to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

Figure 3:
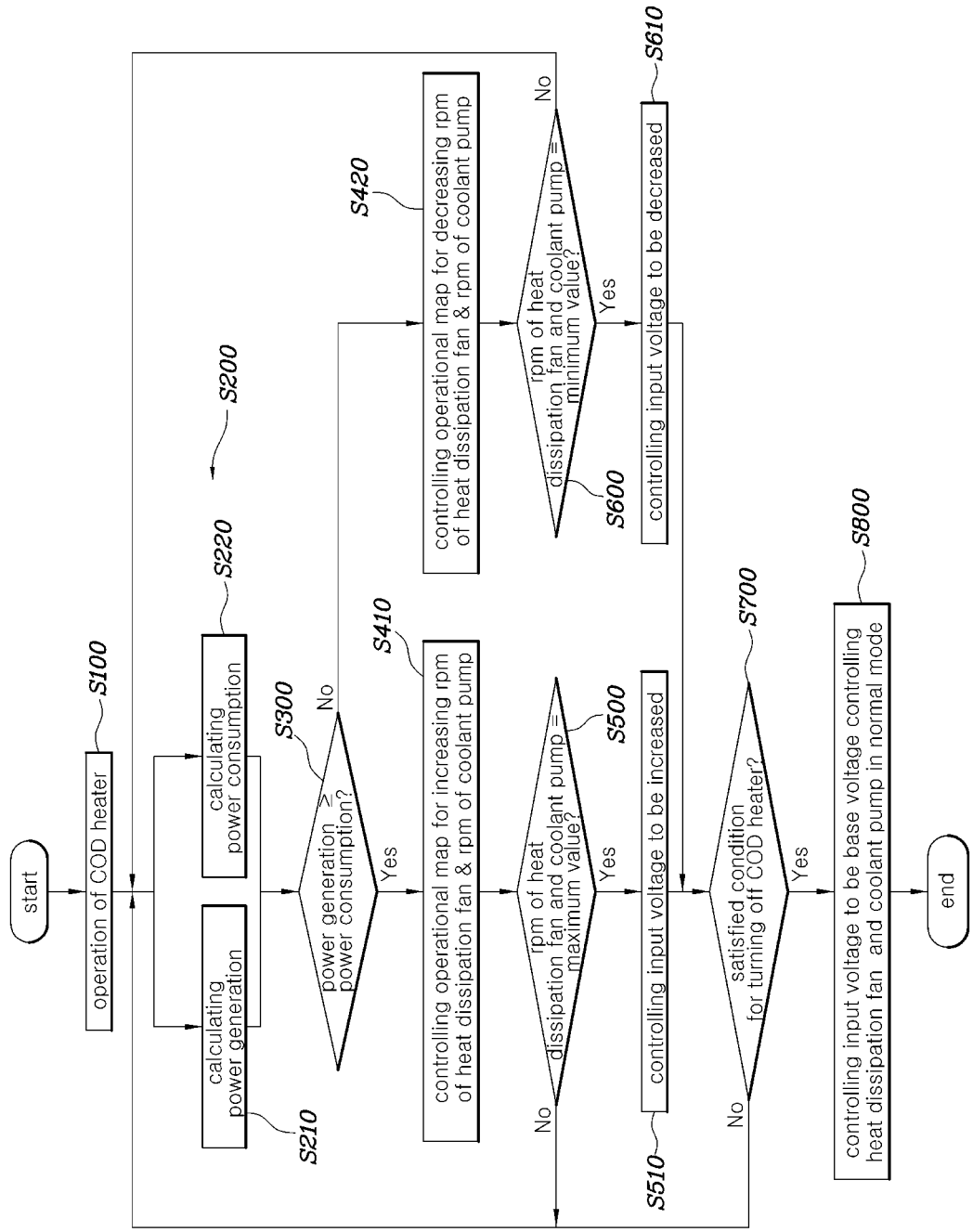
FIG. 3 is a flowchart showing a cathode oxygen depletion (COD) control method for a fuel cell according to an exemplary embodiment of the present invention.

FIG. 3 is a flowchart showing a cathode oxygen depletion (COD) control method for a fuel cell according to an exemplary embodiment of the present invention. The method described herein below may be executed by a controller having a processor and a memory. Referring to FIG. 3, the COD control method for the fuel cell according to the exemplary embodiment of the present invention may include: determining whether a COD heater operates (not shown); calculating power generation and power consumption (S200) when the COD heater operates (S100); and comparing the calculated power generation and power consumption (S300) and adjusting the power consumption (S410), (S420), (S510), and (S610).

Particularly, prior to determining whether the COD heater operates (not shown), the method may further include checking or detecting a charge amount of a high voltage battery (not shown). The COD heater may be operated (S100) a when the charged amount of the high voltage battery is equal to or greater than a predetermined charged amount. Additionally, prior to determining whether the COD heater operates (not shown), the method may further include determining whether a vehicle having the COD heater is in a regenerative braking state. The COD heater may be operated (S100) when the vehicle is in the regenerative braking state and a charge amount of a high voltage battery is equal to or greater than a predetermined charge amount. In other words, the COD heater may be determined to be operated after determining whether the vehicle is operated in the regenerative braking state in which energy is recovered through regenerative braking in a drive motor, the charge amount of the high voltage battery is detected to determine whether the charge amount is equal to or greater than the predetermined charged amount.

Considering a safety of the high voltage battery, the predetermined charge amount may be a level that is preferable to no longer be charged to a maximum charge amount. According to another exemplary embodiment, the COD heater may be operated by determining that the charge amount of the high voltage battery is equal to or greater than the predetermined charge amount even though regenerative braking is not in progress. Conventionally, when the COD heater is operated to consume power, power consumption of auxiliary machinery is adjusting to maintain to a maximum, for example, rotation speeds of a coolant pump and a heat dissipation fan are adjusted to maximum RPM at the same time. It is assumed in the present invention that the operation of the COD heater includes such control.

Furthermore, in the calculating of the power generation (S210), the power generation may be calculated by including power recovered by regenerative braking. The power generation may include power recovered from the drive motor. In addition, the power generation may include power generated from a fuel cell stack during operation of the fuel cell stack, but may not include the charged and discharged energies of the high voltage battery since the energy is not a newly generated power. In the calculating of the power consumption (S220), the power consumption may be calculated by including power consumed by the COD heater, a coolant pump, and a heat dissipation fan cooling a radiator.

In general, when the COD heater is operated, the consumed power is determined by the formula of $P=VI=V^2/R$ and the internal coil resistance is determined by hardware (e.g., a resistance sensor or other type of measuring device). Therefore, when a main bus terminal voltage is constant, power consumption may be constant. In addition, the coolant pump and the heat dissipation fan may be driven at each maximum rotation speed (RPM) for maximum power consumption.

TABLE 1

| Heat dissipation fan [rpm] | Power consumption [W] |
|---|---|
| 700 | 29 |
| 1000 | 41 |
| 1500 | 81 |
| 2000 | 154 |
| 3000 | 437 |
| 4200 | 1120 |

Table 1 shows the power consumption of the heat dissipation fan according to a rotation speed when the heat dissipation fan is applied with 400 V. Referring to Table 1, the heat dissipation fan may consume power of 1120 W maximally but the power consumption is capable of being decreased to 29 W as the rotation speed thereof is changed. Therefore, the power consumed in the heat dissipation fan is capable of being controlled below 1100 W approximately as the rotation speed of the heat dissipation fan is adjusted.

TABLE 2

| Pump [rpm] | Power consumption [W] |
|---|---|
| 2500 | 11 |
| 3000 | 21 |
| 6000 | 180 |

Table 2 shows the power consumption of the coolant pump according to a rotation speed when the coolant pump is applied with 400 V. Referring to Table 2, the coolant pump may consume power of 180 W maximally but the power consumption is capable of being decreased to 11 W as the rotation speed thereof is changed. Therefore, the power consumed in the coolant pump is capable of being controlled below 170 W as the rotation speed of the coolant pump is adjusted.

After comparing the calculated power consumption and power generation (S300), the adjusting of the power consumption (S410), (S420), (S510), and (S610) may include adjusting the rotation speed of the coolant pump or the heat dissipation fan cooling the radiator to be varied based on a difference between the calculated power consumption and power generation. In particular, the adjusting of the power consumption (S410), (S420), (S510), and (S610) may include increasing the rotation speed of the coolant pump or the heat dissipation fan cooling the radiator when the power consumption is equal to or less than the power generation (S410). On the other hand, the rotation speed of the coolant pump or the heat dissipation fan cooling the radiator may be decreased when the power consumption exceeds the power generation (S420).

Additionally, in the adjusting of the power consumption (S410), (S420), (S510), and (S610), a voltage applied to the COD heater may be variably adjusted (S510) or (S610) when the rotation speed of the coolant pump or the heat dissipation fan becomes a predetermined maximum value (S500) or minimum value (S600).

TABLE 3

| Input voltage [V] | Power consumption of COD heater [kW] (based on 8.8 Ω) |
|---|---|
| 400 | 18.2 |
| 374 | 15.9 |
| 350 | 13.9 |
| 340 | 13.1 |
| 330 | 12.4 |
| 320 | 11.6 |
| 310 | 10.9 |
| 300 | 10.2 |

Table 3 shows the power consumption of the COD heater according to an input voltage of the COD heater. Referring to Table 3, the COD heater consumes 18.2 kW when the input voltage is 400 V, but consumes 10.2 kW when the input voltage is 300 V. Therefore, the power consumption may be controlled by an adjustment of the input voltage of the COD heater.

In the adjusting of the power consumption (S410), (S420), (S510), and (S610), the voltage applied to the COD heater may be increased (S510) when the rotation speed of the coolant pump or the heat dissipation fan becomes the predetermined maximum value (S500). On the other hand, the voltage applied to the COD heater may be decreased (S610) when the rotation speed of the coolant pump or the heat dissipation fan becomes the predetermined minimum value (S600). In other words, the power consumption is no longer controlled by the adjustment of the rotation speed of the coolant pump or the heat dissipation fan when the rotation speed of the coolant pump or the heat dissipation fan is adjusted to be the maximum value or the minimum value, and thus, the voltage applied to the COD heater is capable of being adjusted.

The voltage applied to the COD heater relates to various fuel cell systems such as a drive motor, auxiliary machinery, and the like. Therefore, after the rotation speed of the coolant pump or the heat dissipation fan, which is capable of being controlled individually is adjusted and the rotation speed of the coolant pump or the heat dissipation fan is adjusted to be the maximum value or the minimum value, the voltage applied to the COD heater is capable of being adjusted.

Particularly, it is described above that the voltage applied to the COD heater is adjusted when the power consumption is not controlled by operating the coolant pump or the heat dissipation fan. However, it may be possible that the operations of the COD heater and the coolant pump or the heat dissipation fan is executed simultaneously, or the adjustment of the voltage applied to the COD heater may be executed in advance. Since the power consumption is changed substantially when the voltage applied to the COD heater is varied minimally, adjusting the voltage applied to the COD heater may be advantageous to a response and a control range.

Further, in the adjusting of the power consumption (S410), (S420), (S510), and (S610), a bidirectional DC-DC converter (BHDC) of the main bus terminal connected to the fuel cell stack may be operated to change the voltage applied to the COD heater. The voltage applied to the COD heater may be equal to a voltage of the main bus terminal or changed by the voltage of the main bus terminal, and the voltage of the main bus terminal may be changed by operating the BHDC.

Afterward, whether the operation of the COD heater is a condition to be turned off may be determined (S700). The COD heater operation may be turned off when the regenerative braking is insufficient due to the completion of the drive on the downhill road, or the charge amount of the battery reduces to below the predetermined charge amount. Accordingly, the voltage of the BHDC may be adjusted to be a base voltage (e.g., a starting voltage), and the heat dissipation fan and the coolant pump may be operated in a normal mode in which temperatures thereof are adjusted by a separate temperature sensor or the like (S800).

Figure 4:
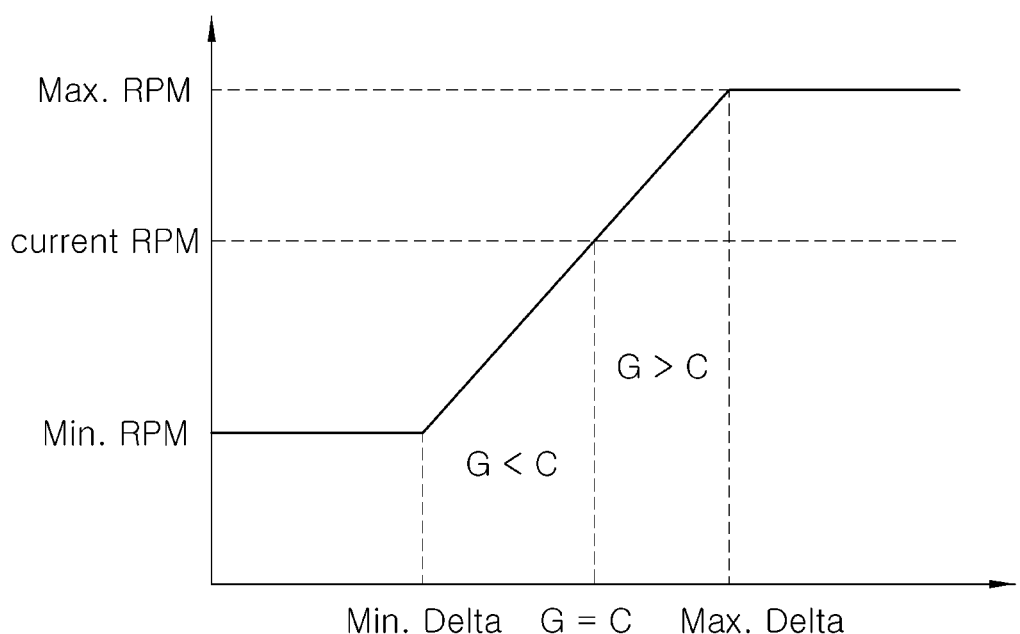
FIGS. 4 and 5 show control maps according to the power generation and the power consumption according to the exemplary embodiment of the present invention.
Figure 5:
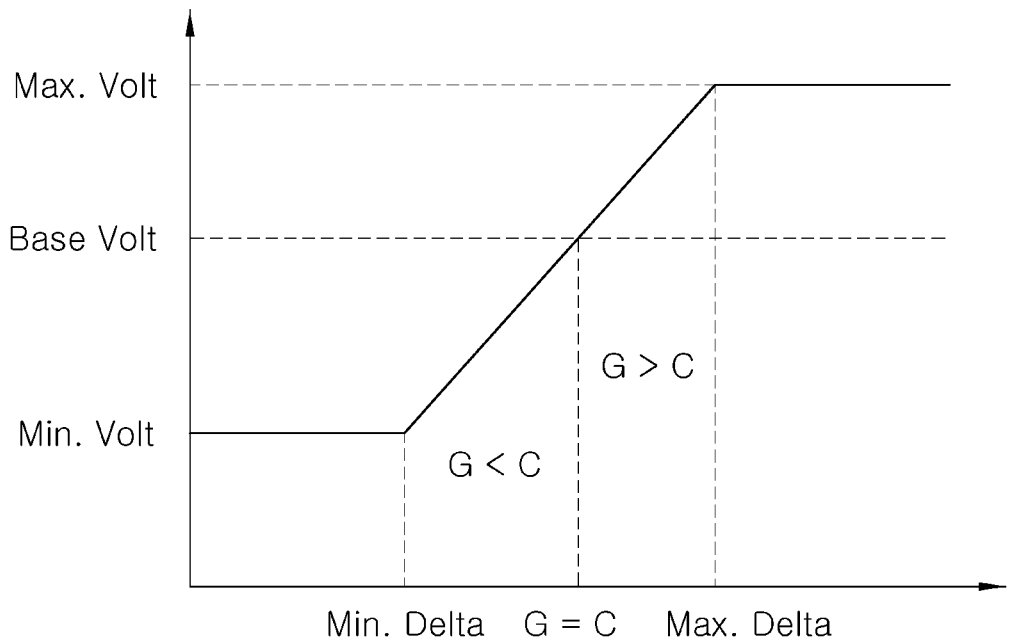

FIGS. 4 and 5 show control maps according to the power generation and the power consumption according to the exemplary embodiment of the present invention. Referring to FIG. 4, in adjusting the power consumption, the rotation speed of the coolant pump or the heat dissipation fan may be variably adjusted using a prestored map. Referring to FIG. 5, the voltage applied to the COD heater may be variably adjusted by the prestored map based on the difference between the calculated power consumption and power generation.

Particularly, when the power generation is equal to the power consumption (G=C), the present RPM or the base voltage may be maintained. When the power generation is greater than the power consumption (G>C), the rotation speed of the coolant pump or the heat dissipation fan may be increased and also the voltage applied to the COD heater, thereby increasing the power consumption. When the power generation is less than the power consumption (G<C), the rotation speed of the coolant pump or the heat dissipation fan may be decreased and also the voltage applied to the COD heater, thereby decreasing the power consumption.

The greater the difference between the power generation and the power consumption, the greater the change in the RPM or the input voltage and the greater or lesser the power consumption increase or decrease. The maximum or minimum value of the rotation speed may be set and controlled only in a range between the maximum and minimum values, considering the stability and the noise problem of the coolant pump and the heat dissipation fan. Additionally, the maximum or minimum value of the voltage applied to the COD heater may be set and controlled only in a range between the maximum and minimum values, considering the stability of other devices connected to the main bus terminal.

Figure 6:
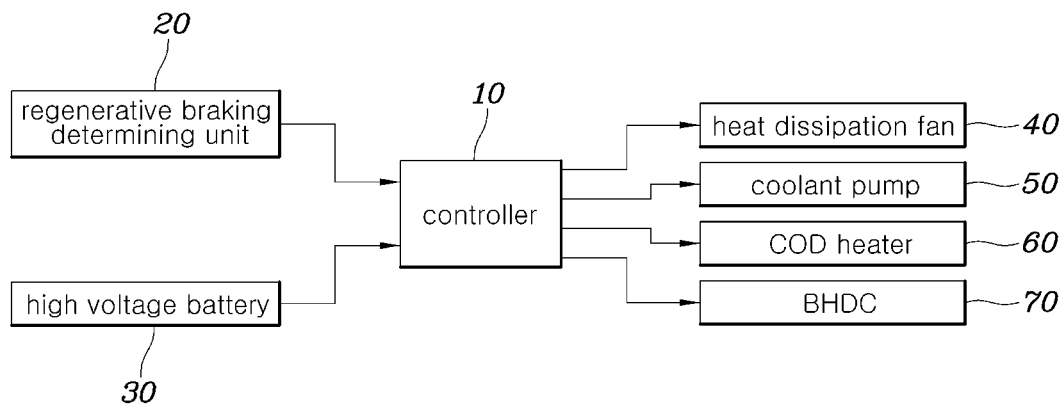
FIG. 6 is a block diagram of a COD control system for the fuel cell according to the exemplary embodiment of the present invention.

FIG. 6 is a block diagram of a COD control system for the fuel cell according to the exemplary embodiment of the present invention. Referring to FIG. 6, the COD control system according to the exemplary embodiment of the present invention may include a COD heater 60 configured to consume power of the main bus terminal connected to the fuel cell stack; and a controller 10 configured to determine whether the COD heater 60 operates, calculate power generation and power consumption when the COD heater operates, and adjust the power consumption by comparing the calculated power generation and power consumption.

The system may further include a regenerative braking determining unit 20 configured to determine whether the vehicle having the COD heater 60 is in the regenerative braking state; and a high voltage battery 30 connected to the main bus terminal and configured to store power through charging or supplying power through discharging. The controller 10 may be configured to operate the COD heater 60 when the regenerative braking determining unit 20 determines that the vehicle is in the regenerative braking state and the charge amount of the high voltage battery 30 is equal to or greater than a predetermined charge amount.

The controller 10 and the regenerative braking determining unit 20 may be separate controllers or may be included in a fuel control unit (FCU). In particular, the controller 10 may be configured to adjust the power consumption by variably changing the rotation speed of the coolant pump 50 or the heat dissipation fan 40 cooling the radiator. Additionally, the controller 10 may be configured to variably adjust the voltage applied to the COD heater 60 when the rotation speed of the coolant pump 50 or the heat dissipation fan 40 becomes a predetermined maximum or minimum value. The controller 10 may be configured to adjust the power consumption by operating the BHDC 70 of the main bus terminal connected to the fuel cell stack and variably changing the voltage applied to the COD heater 60.

Therefore, the controller 10 may be configured to receive information of the regenerative braking determining unit 20 and the high voltage battery 30, determine whether the COD heater 60 operates, operate the COD heater 60 (if not already operating), compare the power generation and the power consumption, and variably adjust the rotation speed of the heat dissipation fan 40 and the coolant pump 50 or operate the BHDC 70 to adjust the power consumption, thereby variably adjusting the voltage applied to the COD heater 60. In particular, the detailed description of the COD control system for the fuel cell is same with the COD control method for the fuel cell so will be omitted.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cathode oxygen depletion (COD) control method for a fuel cell to prevent energy consumption of a battery when a COD heater operates during regenerative braking, comprising:

detecting, by a controller, a charge amount of the battery, wherein the COD heater is operated when the charge amount of the battery is equal to or greater than a predetermined charge amount, and the COD heater is turned off when the regenerative braking is insufficient or when the charge amount of the battery reduces to below the predetermined charge amount;

determining, by the controller, that the COD heater operates;

in response to determining that the COD heater operates, calculating, by the controller, power generation and power consumption, wherein the power generation is calculated by including power recovered by the regenerative braking and the power consumption is calculated by including power consumed by the COD heater, a coolant pump, and a heat dissipation fan cooling a radiator; and adjusting, by the controller, the power consumption by comparing the calculated power generation and power consumption, wherein a rotation speed of the coolant pump or the heat dissipation fan cooling the radiator is adjusted based on a difference between the calculated power consumption and power generation, wherein the rotation speed of the coolant pump or the heat dissipation fan is increased when the power assumption is equal to or less than the power generation, and the rotation speed of the coolant pump or the heat dissipation fan is decreased when the power consumption exceeds the power generation.

2. The method of claim 1, further comprising:

prior to determining whether the COD heater operates, determining, by the controller, whether a vehicle having the COD heater is in a regenerative braking state, wherein the COD heater is operated when the vehicle is in the regenerative braking state.

3. The method of claim 1, wherein the rotation speed of the coolant pump or the heat dissipation fan is variably adjusted using a prestored map.

4. A cathode oxygen depletion (COD) control method for a fuel cell to prevent energy consumption of a battery when a COD heater operates during regenerative braking, comprising:

detecting, by a controller, a charge amount of the battery, wherein the COD heater is operated when the charge amount of the battery is equal to or greater than a predetermined charge amount, and the COD heater is turned off when the regenerative breaking is insufficient or when the charge amount of the battery reduces to below the predetermined charge amount, determining, by the controller, that the COD heater operates;

in response to determining that the COD heater operates, calculating, by the controller, power generation and power consumption, wherein the power generation is calculated by including power consumed by the COD heater, a coolant pump, and a heat dissipation fan cooling a radiator; and adjusting, by the controller, the power consumption by comparing the calculated power generational and power consumption, wherein a rotation speed of the coolant pump or the heat dissipation fan cooling the radiator is adjusted based on a difference between the calculated power consumption and power generation, wherein a voltage applied to the COD heater is variably adjusted when the rotation speed of the coolant pump or the heat dissipation fan becomes a predetermined maximum value or minimum value.

5. The method of claim 4, wherein the voltage applied to the COD heater is variably adjusted using a prestored map based on the difference between the calculated power consumption and power generation.

6. The method of claim 4, wherein the voltage applied to the COD heater is increased when the rotation speed of the coolant pump or the heat dissipation fan becomes the predetermined maximum value, and the voltage applied to the COD heater is decreased when the rotation speed of the coolant pump or the heat dissipation fan becomes the predetermined minimum value.

7. The method of claim 4, wherein a bidirectional direct current-direct current (DC-DC) converter of a main bus terminal connected to a fuel cell stack is operated to change the voltage applied to the COD heater.

* * * * *